(12) United States Patent
Bagnall et al.

(10) Patent No.: US 8,056,407 B2
(45) Date of Patent: Nov. 15, 2011

(54) METHOD FOR ASSESSING DEGRADATION OF A COATING ON A COMPONENT BY MEASURING ITS SURFACE ROUGHNESS

(75) Inventors: Stephen M. Bagnall, Bristol (GB); Julian C. Mason-Flucke, Bristol (GB); Catherine M. F. Rae, Cambridge (GB); Siavash Pahlavanyali, Cambridge (GB)

(73) Assignee: Rolls-Royce PLC, London (GB)

(*) Notice: Subject to any disclaimer, the term of this patent is extended or adjusted under 35 U.S.C. 154(b) by 652 days.

(21) Appl. No.: 12/232,380

(22) Filed: Sep. 16, 2008

(65) Prior Publication Data

US 2009/0078032 A1   Mar. 26, 2009

(30) Foreign Application Priority Data

Sep. 21, 2007   (GB) .................................. 0718410.4

(51) Int. Cl.
  *G01N 17/00* (2006.01)
(52) U.S. Cl. .................................... 73/150 R
(58) Field of Classification Search .......... None
  See application file for complete search history.

(56) References Cited

U.S. PATENT DOCUMENTS

| 5,234,769 | A * | 8/1993 | Shevlin ........................... 428/409 |
| 6,210,775 | B1 * | 4/2001 | Ejiri et al. .................... 428/840.1 |
| 2008/0107921 | A1 * | 5/2008 | Kuse et al. .................... 428/811 |

FOREIGN PATENT DOCUMENTS

| JP | A-03-075546 | 3/1991 |
| JP | A-06-008037 | 1/1994 |
| JP | A-06-308037 | * 11/1994 |
| JP | A-06-338485 | 12/1994 |
| JP | A-11-006804 | 1/1999 |

* cited by examiner

*Primary Examiner* — Robert Raevis
(74) *Attorney, Agent, or Firm* — Oliff & Berridge, PLC

(57) ABSTRACT

A method of assessing the degradation of an oxide-forming coating on a component after a period of operational use of the component, said degradation of the coating being caused by depletion of the oxide-forming element within a remnant coating layer due to inter-diffusion of said element between the remnant coating and both an outer oxide layer and an inner, secondary diffusion layer, wherein a depletion parameter indicative of the depletion of the oxide-forming element in the remnant coating layer varies as a function of the surface roughness of the coated component, the method comprising the steps of: carrying out a non-destructive, quantitative measurement of the surface roughness of the component after said period of operational use; and, based on an estimation of the functional relationship between the surface roughness and the depletion parameter, using the result of said measurement of surface roughness to quantitatively assess the degradation of the coating.

12 Claims, 6 Drawing Sheets

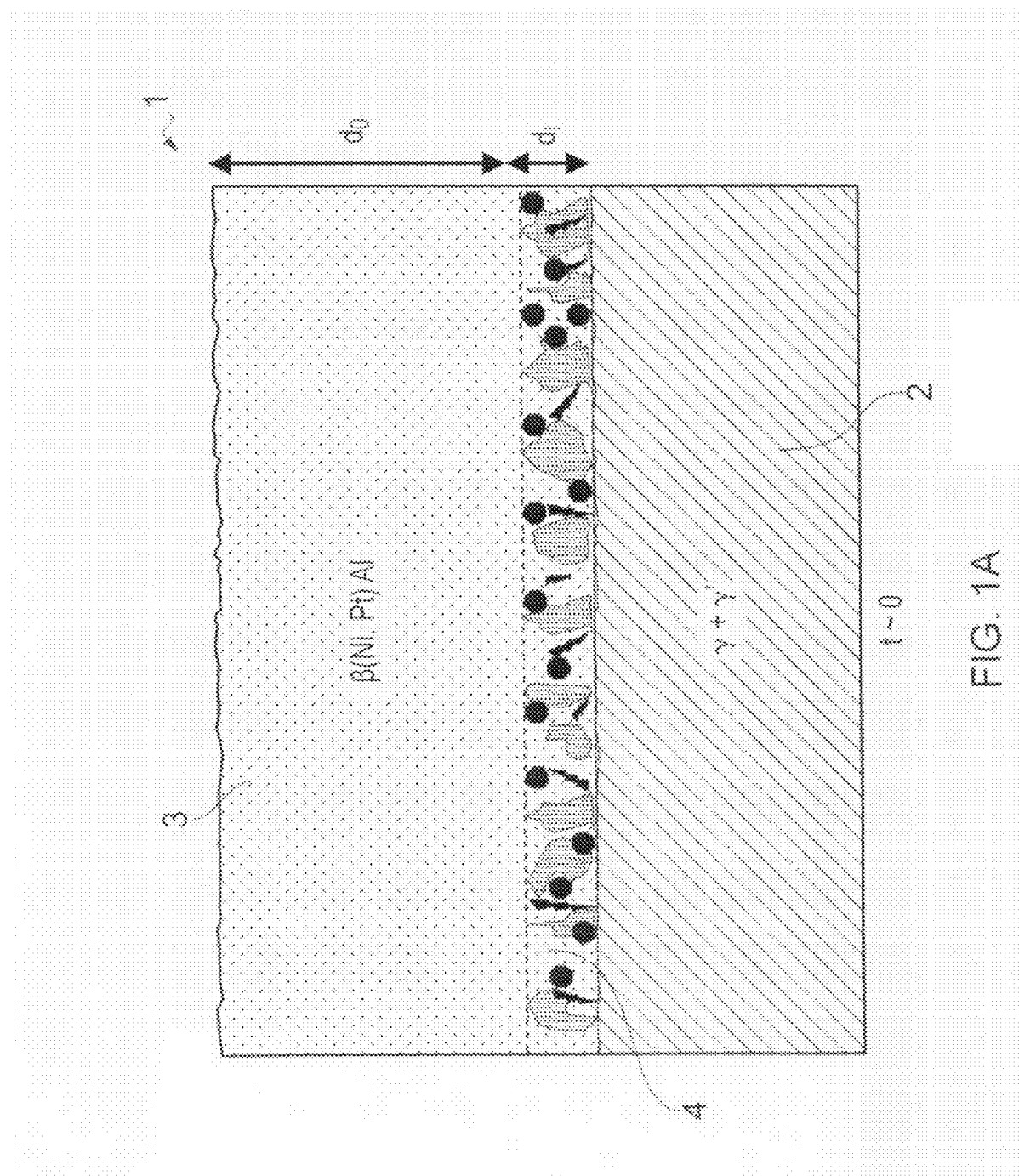

METHOD FOR ASSESSING DEGRADATION OF A COATING ON A COMPONENT BY MEASURING ITS SURFACE ROUGHNESS

BACKGROUND

The present invention relates to a method for assessing the degradation of oxide-forming coatings on components after a period of operation of the component, in particular to a method for assessing degradation of oxide-forming coatings on gas-turbine blades in, for example, aerospace, land-based and marine applications.

Oxidation of the surface of components is a problem that may critically affect operational performance in many different applications. The problem of oxidation is particularly severe in the case of gas-turbine blades, notably in high-temperature aerospace applications, where the base alloys commonly used for the blades may exhibit relatively poor oxidation resistance.

Coating the surface of the relevant component with a protective oxide-forming coating can reduce the problem of oxidation.

Generally speaking, such oxide-forming coatings provide a "reservoir" of an oxide-forming element, such as Aluminum, which ideally forms a stable, continuous, adherent and slow-growing oxide layer on the exposed surface of the coating during operation of the component, in order to protect the underlying component substrate. The oxide-layer is maintained during operation of the component by diffusion of the oxide-forming element into the oxide layer, but this also has the effect of depleting the reservoir of available oxide-forming element in the remainder of the coating. The reservoir provided by the remnant coating is typically also depleted by diffusion of the oxide-forming element into the component substrate, which diffusion forms a secondary inter-diffusion layer between the remnant coating and the unaffected part of the component substrate. Thus, the coating degrades over the course of its life until the reservoir of oxide-forming element in the remnant coating layer becomes exhausted and the coating is unable to maintain the oxide layer, at which point coating failure is likely to occur.

It is commonly the case that the life of an oxide-forming coating is shorter than the operational life of the component itself, and therefore it is preferable to re-coat most components at least once during their life in order to continue to prevent significant oxidation of the surface of the components. On the other hand, in the interest of cost-saving, it is undesirable to prematurely re-coat components. A decision as to whether or not to re-coat a component must balance these competing factors and is therefore normally based on an assessment of the degradation or "life-usage" of the coating.

Conventionally, an assessment of the degradation of the coating is typically carried out via visual methods or so-called "cut-up" methods; however, both of these methods have drawbacks.

In the case of visual methods, these rely on a visual assessment of the exterior of the component and, consequently, the assessment is qualitative by nature and subject at least in part to human judgement and error. Due to the potentially severe consequences of under-estimating the amount of coating degradation, for example in aerospace applications, qualitative human estimates tend to be conservative in nature, which results in premature re-coating and/or scrapping of components.

In the case of "cut-up" methods, the component is cut into sections and the cross-sectional microstructure of the coating is examined. However, due to the destructive nature of the assessment, the assessment must be carried out on a representative sample taken from a component or components, which means that the assessment is prone to statistical inaccuracies. In addition, preparation and examination of the sections is both time-consuming and costly.

SUMMARY

It is an object of the present invention to seek to provide an improved method of assessing the degradation of oxide-forming coatings on components.

According to the present invention there is provided a method of assessing the degradation of an oxide-forming coating on a component after a period of operational use of the component, said degradation of the coating being caused by depletion of the oxide-forming element within a remnant coating layer due to inter-diffusion of said element between the remnant coating and both an outer oxide layer and an inner, secondary diffusion layer, wherein a depletion parameter indicative of the depletion of the oxide-forming element in the remnant coating layer varies as a function of the surface roughness of the coated component, the method comprising the steps of:

carrying out a non-destructive, quantitative measurement of the surface roughness of the component after said period of operational use; and based on an estimation of the functional relationship between the surface roughness and the depletion parameter, using the result of said measurement of surface roughness to quantitatively assess the degradation of the coating.

Thus, it has been found in accordance with the present invention that for an oxide-coating of the type generally described above, applied to a given component, it is possible to determine a relationship between a depletion parameter of the coating, that is a parameter directly indicative of the amount of the relevant oxide-forming element in the remnant coating, and the surface roughness of the component, over a period of operation. Consequently, a quantitative yet non-destructive measurement of the related surface roughness of the coated component can be used to assess the degradation of the coating, based on a determination of the relationship between the depletion parameter and the surface roughness. As well as the actual weight percentage (wt. %) content of the relevant oxide-forming element in the remnant coating, depletion parameters might include, for example, the thickness of the remnant coating layer, the thickness of a secondary inter-diffusion layer and the thickness of the oxide layer itself.

In one embodiment, the step of quantitatively assessing the degradation of the coating comprises: comparing the result of said measurement of surface roughness with a threshold for the surface roughness, said threshold corresponding to a desired threshold for a depletion parameter and being determined on the basis of the estimated relationship between the surface roughness and the respective depletion parameter.

For the purposes of such a comparison, the measured surface roughness and threshold surface roughness may each be expressed in terms of the corresponding value for the respective depletion parameter, based on the respective estimated relationship between that depletion parameter and the surface roughness.

Preferably, the measurement of surface roughness is a measurement of the maximum peak-to-valley height on the surface of the coating. The measurement of surface roughness may be carried out using profilometry.

The coating may be an Aluminide coating, such as a Pt-aluminide coating, or it may be an MCrAlY coating.

The component may be an aerospace component.

In preferred embodiments, the depletion parameter is one of the thickness of the remnant coating layer, the thickness of the secondary inter-diffusion layer or the content of the oxide-forming element in the remnant coating layer

BRIEF DESCRIPTION OF THE DRAWINGS

So that the invention may be readily understood, embodiments of the invention will now be described, by way of example, with reference to the accompanying drawings, in which:

FIGS. 1a, 1b and 1c are schematic cross sections through a coated turbine blade and, taken together, illustrate progressive degradation of the coating during operational use of the turbine blade;

DETAILED DESCRIPTION OF EMBODIMENTS

The examples set out below demonstrate determination of a relationship between a depletion parameter and the surface roughness of an oxide-forming coating.

Figure 1B:
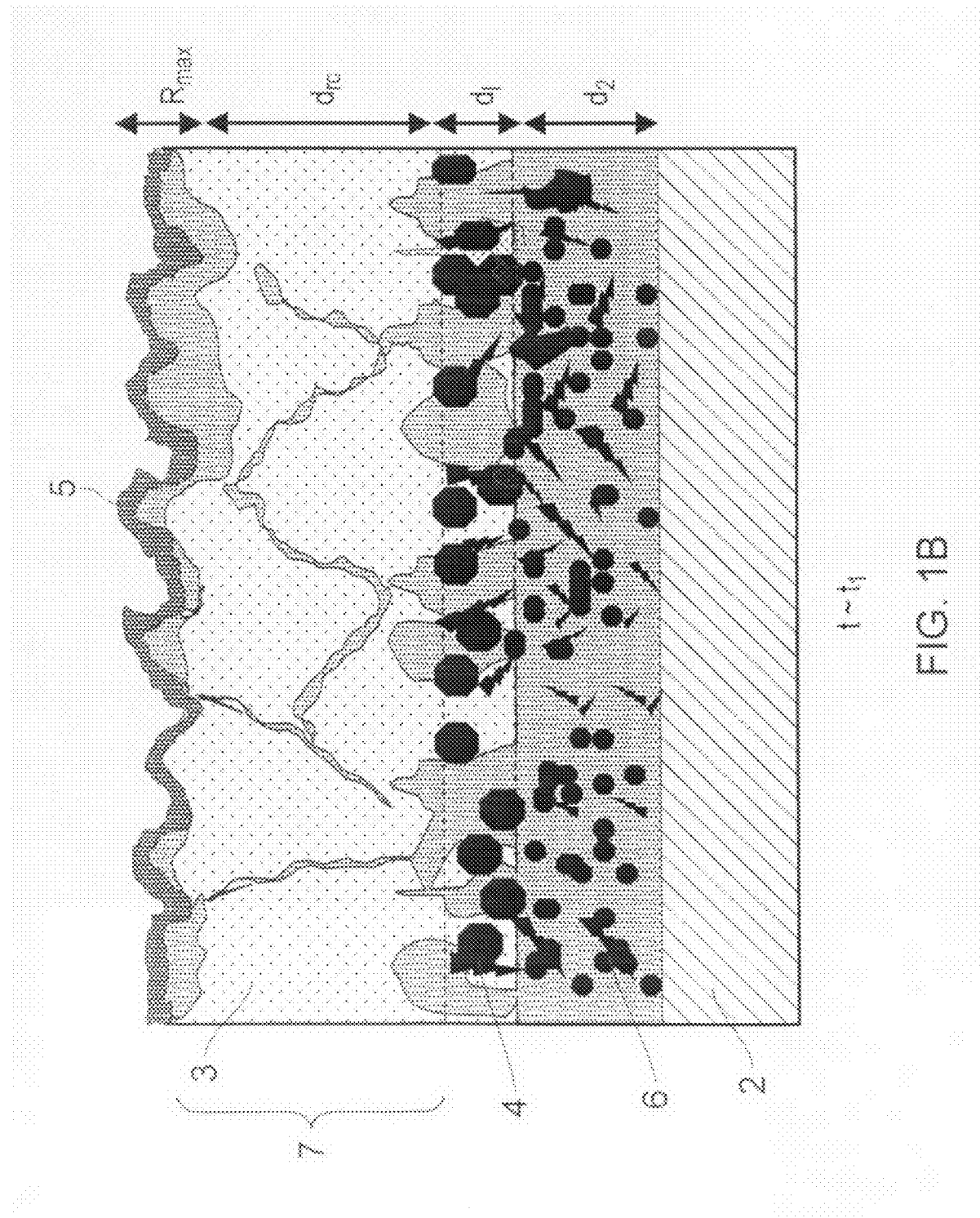
Figure 1C:
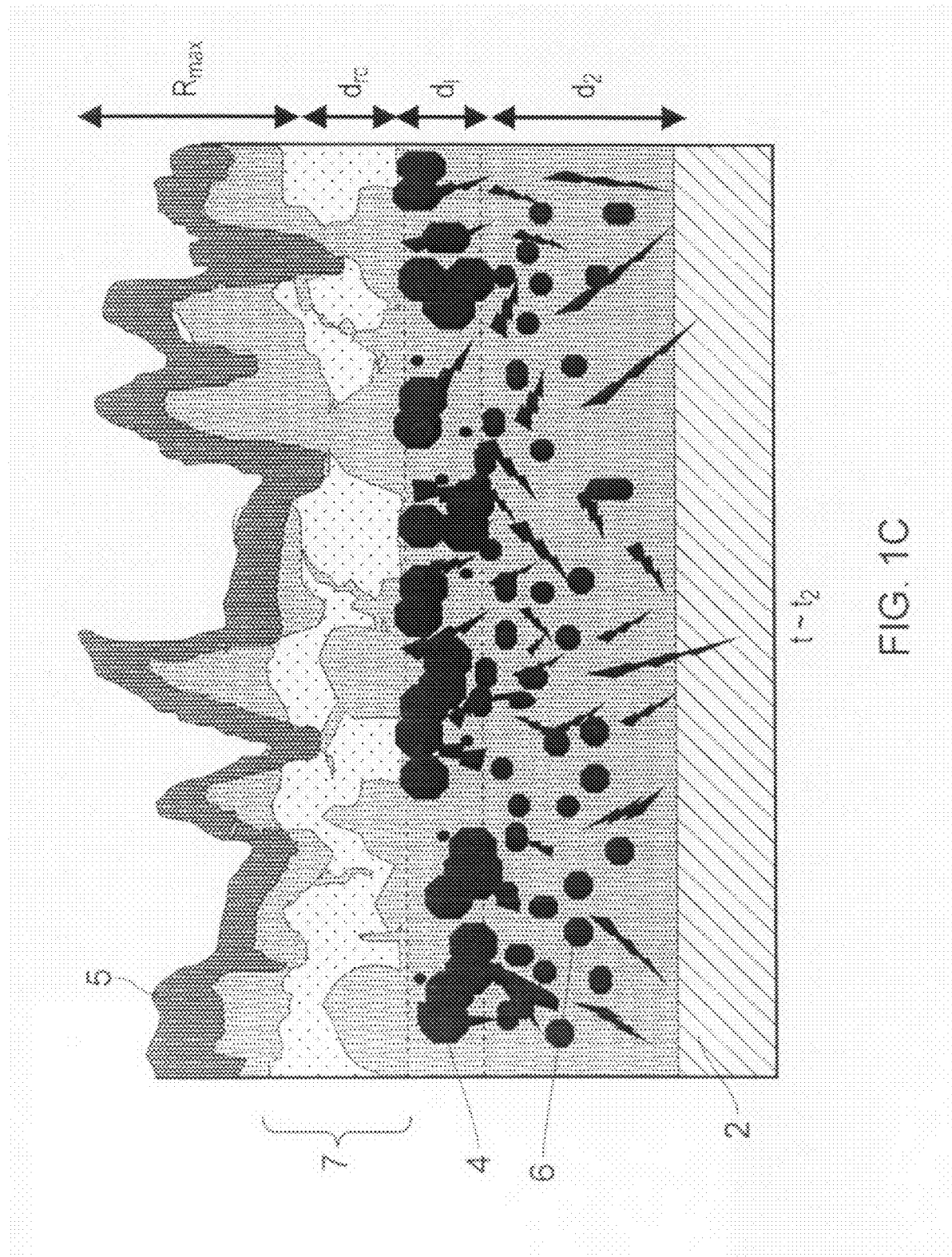

The examples refer specifically to Pt-aluminide coatings having the general microstructure of the coating 1 shown schematically in FIGS. 1a-1c, applied in conventional manner to jet-engine turbine blades.

Referring then to FIG. 1a, the Pt-aluminide coating 1 comprises an Al-rich (Ni,Pt)Al phase 3 with an initial thickness $d_0$, and an initial inter-diffusion layer 4 having a thickness $d_1$. It should be noted that, in practice, the initial thicknesses $d_0$ and $d_1$ may vary across the entire surface of the turbine blade 2, due to the nature of the coating process and the shape of the blade 2; however, this variation can be verified by measurement and is reproducible within a specified scatter band.

FIG. 1b shows the microstructure of the coating 1 and turbine blade 2 after operation of the turbine blade 2 for a period $t_1$. Here, diffusion of Al from the Al-rich phase 3 into the outer surface of the coating 1 has contributed to the formation of a protective oxide-layer 5 ($Al_2O_3$). At the same time, Al has diffused from the Al-rich phase 3 into the turbine blade substrate 2 and combined with the base alloy of the substrate 2 to form an inner, secondary inter-diffusion layer 6 having a thickness $d_2$. The remaining, substantially non-diffused portion of the Al-rich phase 3 forms a remnant coating layer 7, having a thickness $d_{rc}$.

FIG. 1c, shows the microstructure of the coating 1 and turbine blade 2 after operation of the turbine blade 2 for a period $t_2$, whereby the coating 1 has suffered significant degradation and is near to failure. Here, the thickness $d_{rc}$ of the remnant coating layer 7, which has now been critically depleted of Al, is substantially reduced as compared to FIG. 1b, and there has been a corresponding increase in the thickness $d_2$ of the secondary inter-diffusion layer 6, as well as in the thickness of the outer oxide-layer 5.

Referring to FIGS. 1a-1c, it will also be noted that operation of the turbine blade 2 increases the surface roughness of the coating 1 overtime. Thus, in FIG. 1a, the outer surface of the coating 1, defined by the Al-rich phase 3, is relatively smooth; however, in FIGS. 1b and 1c this outer surface, which is now defined by the outer surface of the oxide layer 5, becomes progressively less smooth.

The surface roughness can be represented by the parameter $R_{max}$, shown in FIGS. 1b and 1c, which corresponds to the maximum "peak-to-valley" height of the small-scale variations in the surface profile of the coating 1.

It is possible to measure Rmax using conventional methods, for example by way of profilometry or microscopic examination. It will also be appreciated that it is possible to measure the thickness $d_1$ of the initial inter-diffusion layer, thickness $d_2$ of the secondary inter-diffusion layer, thickness $d_{rc}$ of the remnant coating layer 7 and thickness of the outer oxide-layer 5 in conventional manner, for example by microscopic examination.

Example 1

Tests were carried out on a sample set of three turbine blade specimens. The specimens were subjected to typical engine-operating conditions for a period of 15214 hrs, 17050 hrs and 25432 hrs respectively and then the local surface roughness $R_{max}$ and corresponding remnant coating thickness $d_{rc}$ were measured at various locations across the surface of each specimen, using microscopic examination and/or profilometry.

Figure 2:
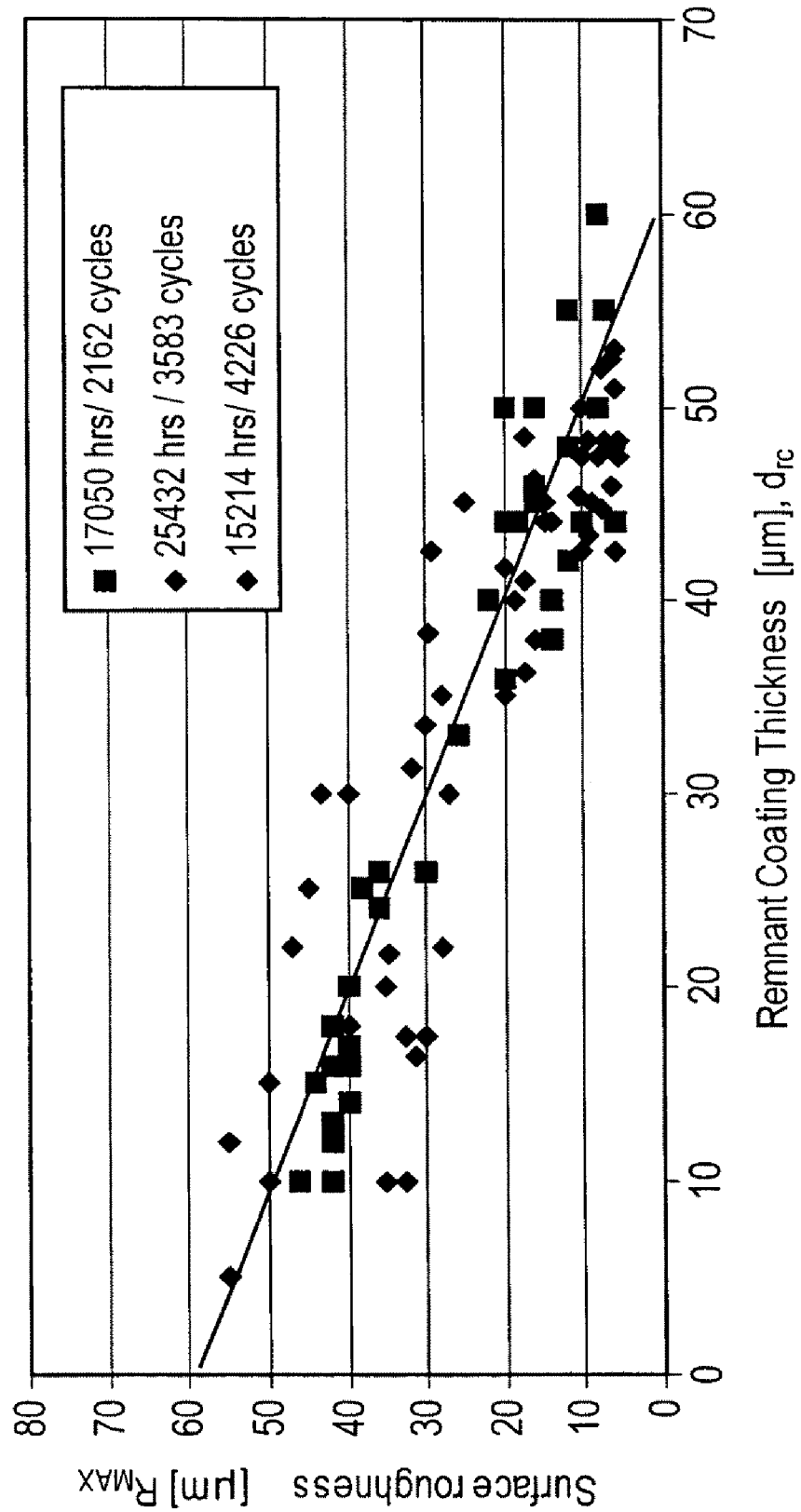
FIG. 2 is a graph illustrating a relationship between the surface roughness and remnant coating thickness for various coated turbine blades.

The results, shown in FIG. 2, indicated a direct linear relationship between the surface roughness $R_{max}$ and the thickness $d_{rc}$ of the remnant coating layer for a Pt-aluminide coating, such that:

$$d_{rc}+R_{max}=\text{constant} \quad (1)$$

Measurements of the initial coating thickness $d_0$ across each specimen revealed that the sum of $d_{rc}$ and $R_{max}$ at each blade location fell within the measured range for the initial coating thickness, $d_0$. Thus, as an approximation, equation (1) may be expressed as:

$$d_{rc}+R_{max}\approx d_{0(min)} \quad (2)$$

where $d_{0(min)}$ is equal to the minimum initial coating thickness for the PtAl coating.

Example 2

Tests were carried out on a sample set of three turbine blade specimens. The specimens were subjected to typical engine-operating conditions for a period of 15214 hrs, 17050 hrs and 25432 hrs respectively and then the local surface roughness $R_{max}$ and corresponding thickness $d_2$ of the secondary inter-diffusion layer were measured at various locations across the surface of each specimen.

Figure 3:
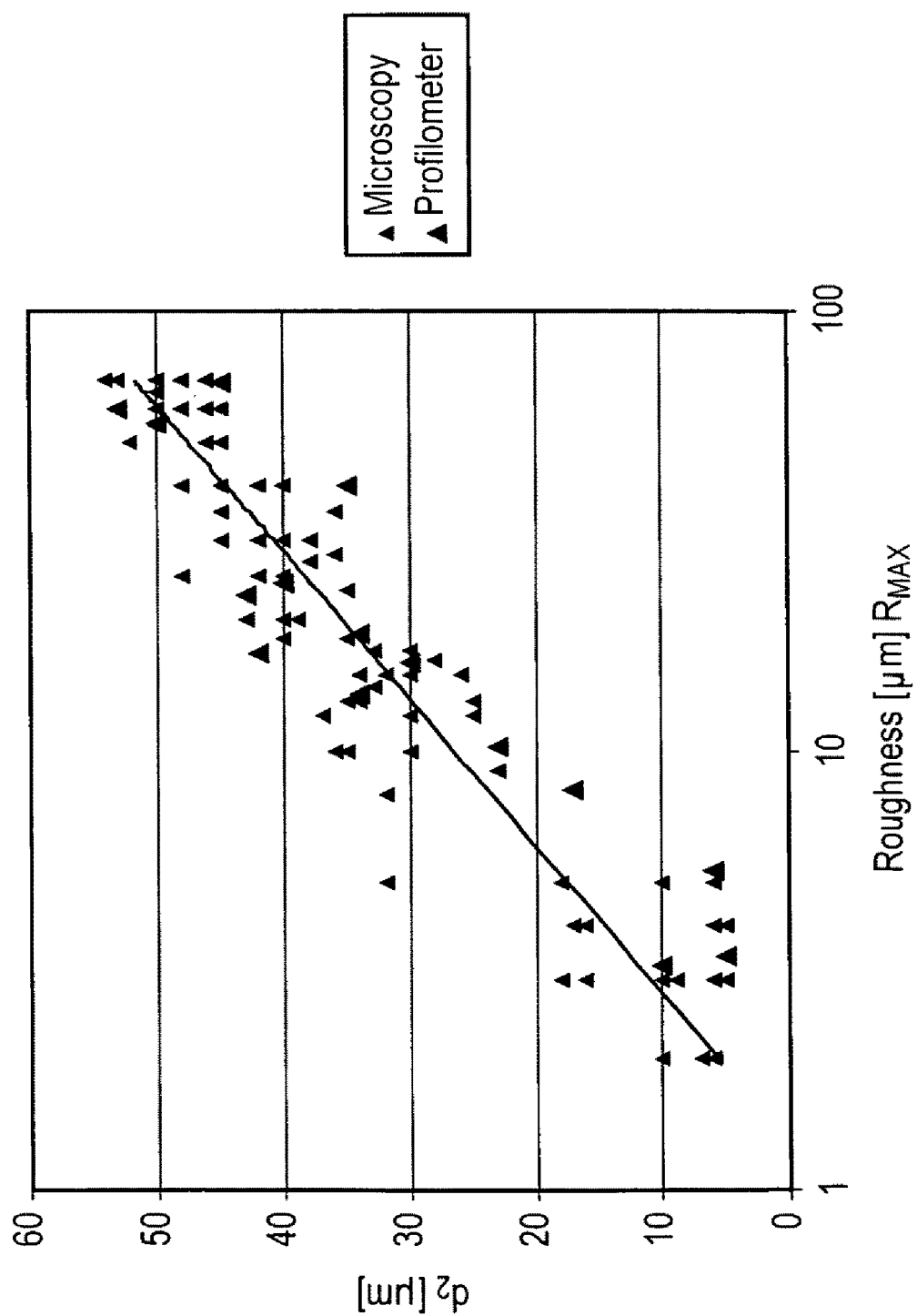
FIG. 3 is a graph illustrating the relationship between the surface roughness and the thickness of the secondary inter-diffusion layer for various coated turbine blades.

FIG. 3 shows the results for log $R_{max}$ plotted against $d_2$. It will be noted that there is a logarithmic relationship between $R_{max}$ and $d_2$.

Example 3

A vapour Pt-aluminide coating was applied to a CMSX-4 substrate and the coating was exposed isothermally to a temperature of 1150° C. for a period of 400 hours.

The surface roughness $R_{max}$ was measured across a sample section of the CMSX-4 substrate after isothermal exposure at 100 hrs and 400 hrs. Corresponding measurements were made of the Al content in the remnant coating layer at 100 hrs and 400 hrs.

Figure 4:
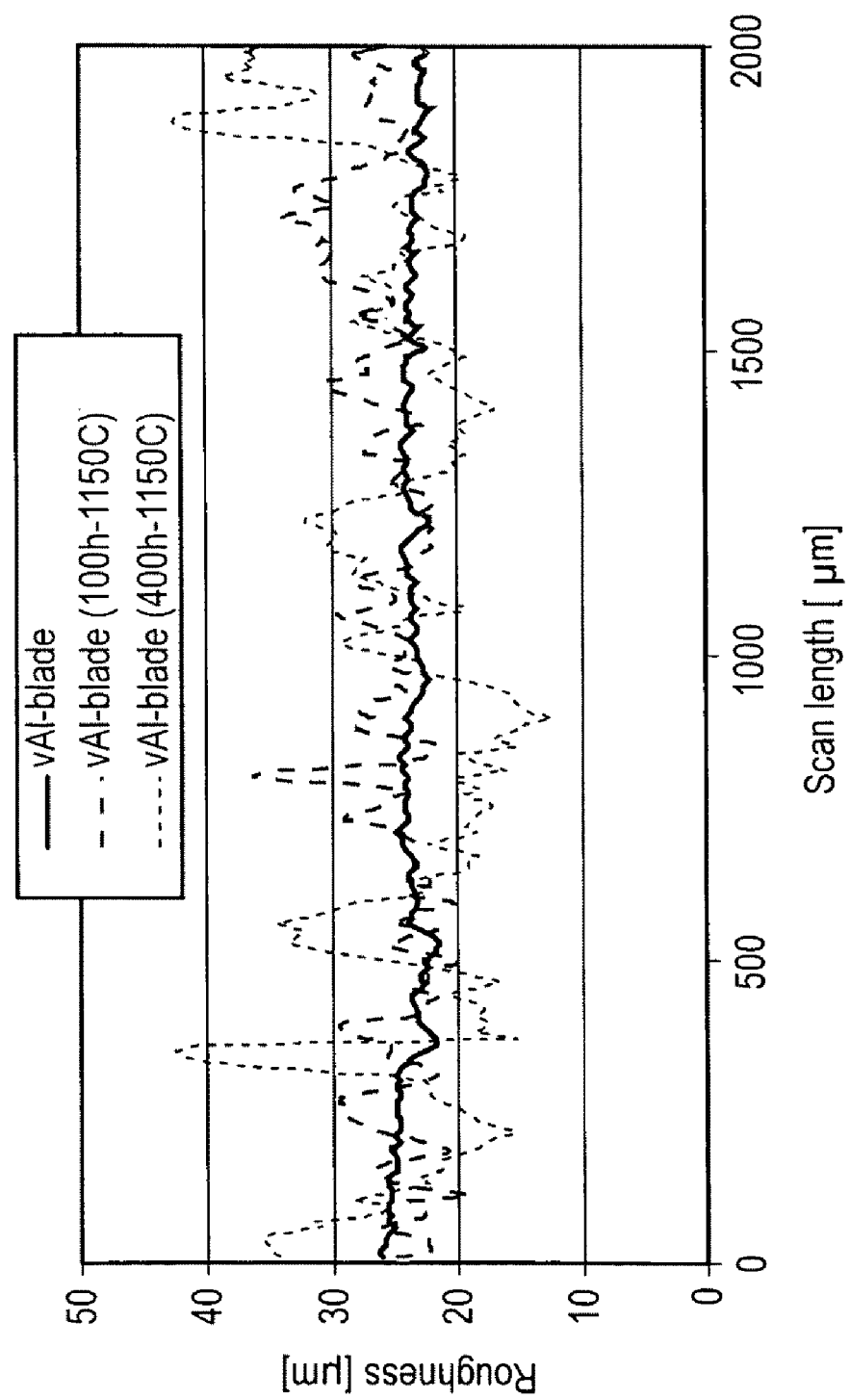
FIG. 4 is a graph illustrating the relationship between surface roughness and the Al content in the remnant coating layer for a coated turbine blade subjected to an isothermal operating temperature.

The results are shown in FIG. 4 and summarised in Table 1 below.

TABLE 1

|  | Exposure time | | |
| --- | --- | --- | --- |
|  | Before tests | 100 h | 400 h |
| Roughness (Rmax) | 5-7 | 15-18 | 22-28 |
| Al content (at. %) | 45 | 29 | 14 |

Results indicate that there is a linear relationship between the Al content in the remnant coating layer and the surface roughness. Coating failure occurred in less than 400 hrs and in that time the Al content reduced to less than the critical level of 19 at. %, where at % is "atomic percentage".

The remnant coating layer thickness $d_{rc}$, thickness $d_2$ and Al content of the remnant coating layer are examples of depletion parameters, being parameters directly indicative of the Al content in the remnant coating layer, and are therefore indicative of the degradation of the relevant coating. Based on an estimate of the relationship between the depletion parameters and surface roughness, as in examples 1 to 3, it is possible to carry out a non-destructive yet quantitative assessment the degradation of a relevant coating on the basis of a measure of surface roughness, rather than direct measurement of the relevant depletion parameter itself.

Thus, in accordance with the present invention, a method of assessing the degradation of a given Pt-aluminide coating comprises non-destructive of the measurement the surface roughness of the coating across a coating turbine blade, for example using a profilometer, and comparing the measured surface roughness to a desired threshold value for the surface roughness in order to assess the degradation of the coating at any particular point on the surface of the turbine blade.

The threshold value for the surface roughness is determined on the basis of a desired threshold value for a depletion parameter, using the corresponding estimated relationship between that depletion parameter and surface roughness, and may be a minimum threshold value or a maximum threshold value. For example, in the case of a Pt-aluminide coating applied to a turbine blade, it may be desirable that re-coating of the blade is carried out when the remnant coating thickness is 20 µm. Referring to FIG. 2 or equation 2 above (being an estimation of the relationship between remnant coating layer thickness $d_{rc}$ and surface roughness $R_{max}$), it will be noted that this value corresponds to a threshold value of 30 µm for the surface roughness $R_{max}$. Thus, if the measured value for the surface roughness $R_{max}$ exceeds the threshold value of 30 µm, this is an indication that the remnant coating thickness is below 20 µm and that re-coating of the blade is necessary.

It will be appreciated that the above-described method is quantitative, in the sense that it is a numerical assessment of coating degradation based on actual measurement, and not a mere qualitative assessment. At the same time, measurement of the surface roughness using a profilometer is non-destructive. Consequently, in assessing degradation of the coating according to the present invention, many measurements of the surface roughness can be taken at various points across the respective coated component, without destroying the component, so that a quantitative, local assessment of coating degradation can be taken at each point across the surface of the coated component without destroying the component.

Whilst a quantitative assessment may include comparison of a measured surface roughness $R_{max}$ with a calculated threshold value for the surface roughness, and this is preferable where assessment of the degradation is in the context of deciding whether to re-coat the component, quantitative assessment in accordance with the present invention is not so-limited. Indeed, quantitative assessment may comprise any assessment whereby a measurement of the surface roughness is taken and, using an estimated relationship between a depletion parameter and the surface roughness of the coating, the results of the surface roughness measurement are linked to a depletion parameter, either by expressing theoretical values for a depletion parameter in terms of a surface roughness in the manner described above, or by expressing the results of surface roughness measurements in terms of one or more depletion parameters for allowing direct analysis of coating degradation.

Although embodiments of the invention have been described in relation to Pt-aluminide coatings, it will be appreciated that the method of assessing degradation of a coating could equally be used in conjunction with any oxide-forming coating of the type generally described herein, provided that there is a relationship between at least one depletion parameter and surface roughness. For example, it is envisaged that the method can be used to assess degradation of other aluminide coatings and MCrAlY coatings on components. Similarly, whilst embodiments of the invention have been described with reference to coatings on turbine blades, the method can be used to assess suitable coatings on other components.

In addition, it will be appreciated that the method is not limited to any particular depletion parameter and, for example, an assessment of coating degradation could equally be carried out on the basis of a relationship between surface roughness and the alternative depletion parameters set out in examples 2 and 3 above.

Whilst the measurement of surface roughness for the purpose of assessing coating degradation is preferably carried out using profilometry, other non-destructive measuring methods can be used where appropriate. Due to the non-destructive nature of the measurement, it is envisaged that the method could be carried out "in-situ" (for example "in-engine" in aerospace applications; alternatively, the component could be removed for "remote" assessment.

Although in the described embodiments the surface roughness is equated to $R_{max}$, it is envisaged that the surface roughness may be represented differently and, for example, it is envisaged that average roughness ($R_a$), the root mean square roughness ($R_q$), maximum peak height ($R_p$) or the maximum valley height ($R_v$) can be used as a measure of the surface roughness of a coating, with the relationship between surface roughness and a depletion parameter being determined accordingly.

The invention claimed is:

1. A method of assessing the degradation of an oxide-forming coating on a component after a period of operational use of the component, said degradation of the coating being caused by depletion of the oxide-forming element within a remnant coating layer due to inter-diffusion of said element between the remnant coating and both an outer oxide layer and an inner, secondary diffusion layer, wherein a depletion parameter indicative of the depletion of the oxide-forming element in the remnant coating layer varies as a function of the surface roughness of the coated component, the method comprising the steps of:

carrying out a non-destructive, quantitative measurement of the surface roughness of the component after said period of operational use; and based on an estimation of the functional relationship between the surface roughness and the depletion parameter, using the result of said measurement of surface roughness to quantitatively assess the degradation of the coating.

2. A method according to claim 1, wherein said step of quantitatively assessing the degradation of the coating comprises:

comparing the result of said measurement of surface roughness with a threshold for the surface roughness, said threshold corresponding to a desired threshold for a depletion parameter and being determined on the basis of the estimated relationship between the surface roughness and the respective depletion parameter.

3. A method according to claim 2, wherein, for the purposes of said comparison, the measured surface roughness and threshold surface roughness are each expressed in terms of the corresponding value for the respective depletion parameter, based on said respective estimated relationship.

4. A method according to claim 1, wherein the measurement of surface roughness is a measurement of the maximum peak-to-valley height on the surface of the coating.

5. A method according to claim 1, wherein the measurement of surface roughness is carried out using profilometry.

6. A method according to claim 1, wherein the coating is an Aluminide coating.

7. A method according to claim 6, wherein the coating is a Pt-Aluminide coating.

8. A method according to claim 1, wherein the coating is an MCrAlY coating.

9. A method according to claim 1, wherein the component is an aerospace component.

10. A method according to claim 1, wherein the depletion parameter is the thickness of the remnant coating layer.

11. A method according to claim 1, wherein the depletion parameter is the thickness of the secondary inter-diffusion layer.

12. A method according to claim 1, wherein the depletion parameter is the content of the oxide-forming element in the remnant coating layer.

* * * * *